(12) United States Patent
Shi

(10) Patent No.: US 8,086,065 B2
(45) Date of Patent: Dec. 27, 2011

(54) APPARATUS AND METHOD FOR CONTRAST ENHANCEMENT

(75) Inventor: Miaohong Shi, Tainan (TW)

(73) Assignee: Himax Imaging, Inc., Grand Cayman (KY)

( * ) Notice: Subject to any disclaimer, the term of this patent is extended or adjusted under 35 U.S.C. 154(b) by 938 days.

(21) Appl. No.: 12/061,558

(22) Filed: Apr. 2, 2008

(65) Prior Publication Data
US 2009/0252432 A1 Oct. 8, 2009

(51) Int. Cl.
*G06K 9/40* (2006.01)
(52) U.S. Cl. .................................................. 382/274
(58) Field of Classification Search .......... 382/274, 382/270, 272, 276, 286
See application file for complete search history.

(56) References Cited

U.S. PATENT DOCUMENTS

| 7,652,808 | B2 * | 1/2010 | Bala | 358/520 |
| 2002/0031277 | A1 * | 3/2002 | Lubin et al. | 382/254 |
| 2003/0161548 | A1 * | 8/2003 | Vuylsteke | 382/274 |

* cited by examiner

*Primary Examiner* — Yon Couso
(74) *Attorney, Agent, or Firm* — Stout, Uxa, Buyan & Mullins, LLP

(57) ABSTRACT

Apparatus and method for contrast enhancement are disclosed. An adjustable blending unit is utilized for adjustably blending a linear contrast function with a nonlinear contrast function, thereby resulting in an adjustable contrast curve. The nonlinear contrast function is adjustable by a blending parameter such that distance of the contrast curve to linear contrast curve may be changed.

16 Claims, 3 Drawing Sheets

APPARATUS AND METHOD FOR CONTRAST ENHANCEMENT

BACKGROUND OF THE INVENTION

1. Field of the Invention

The present invention generally relates to contrast enhancement, and more particularly to adaptable and adjustable transfer curve for contrast enhancement.

2. Description of the Prior Art

Contrast enhancement is one of the important digital image processing operations. The contrast enhancement operation improves the visual quality of an image with poor intensity distribution. For example, a severely faded paper is very low in contrast whose intensity distribution is concentrated in limited grey values.

Traditional histogram equalization is widely used to redistribute or equalize the histogram of the entire image. However, this method is computation intensive and therefore a slow operation. Binary contrast enhancement, or thresholding, is also traditionally used. In this operation, all pixels of brightness less than the threshold are set to black (0), and those above the threshold are set to white (255). As the binary contrast enhancement creates a very high-contrast image, it has limited application of, for example, recognizing the contour or shape of object(s) in the image. Accordingly, a contrast enhancement generally has a transfer curve rather than the sharp change in the binary contrast enhancement.

Lookup table (LUT) is one approach to the transfer curve in contrast enhancement. However, the LUT method disadvantageously requires a great amount of memories, and retrieving data from the memories results in more access cycles. Piecewise linear approximation is another approach to the transfer curve in contrast enhancement. Nevertheless, the piecewise linear method needs a number of registers for storing end points, and likely incurs approximation errors.

Accordingly, a need has arisen to propose a fast and simple way for contrast enhancement.

SUMMARY OF THE INVENTION

In view of the foregoing, it is an object of the present invention to provide a fast and simple way for contrast enhancement. The disclosed contrast enhancement and its associated transfer curve require substantially less computation compared to conventional contrast enhancement methods. Moreover, users may conveniently scale the shape, adjust the strength of the transfer curve, and change the threshold (or transitional point).

According to the embodiment of the present invention, an adjustable blending unit is utilized for adjustably blending a linear contrast function with a nonlinear contrast function, thereby resulting in an adjustable contrast curve. The nonlinear contrast function is adjustable by a blending parameter such that distance of the contrast curve to the linear contrast curve may be changed. The contrast curve is further adjustable by a strength parameter such that the transitional point or threshold of the contrast curve may be changed.

DETAILED DESCRIPTION OF THE INVENTION

Figure 1:
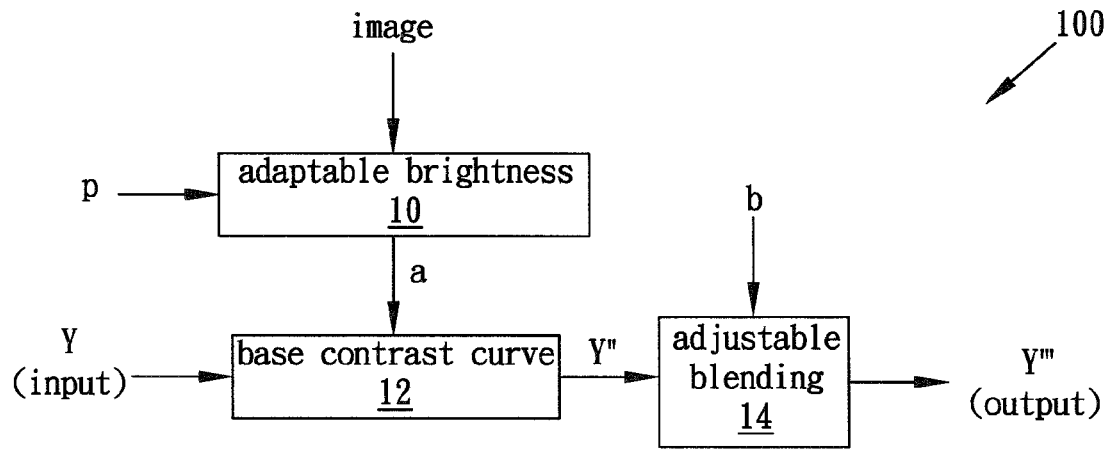
FIG. 1 shows a block diagram illustrating apparatus for contrast enhancement according to one embodiment of the present invention.
Figure 2:
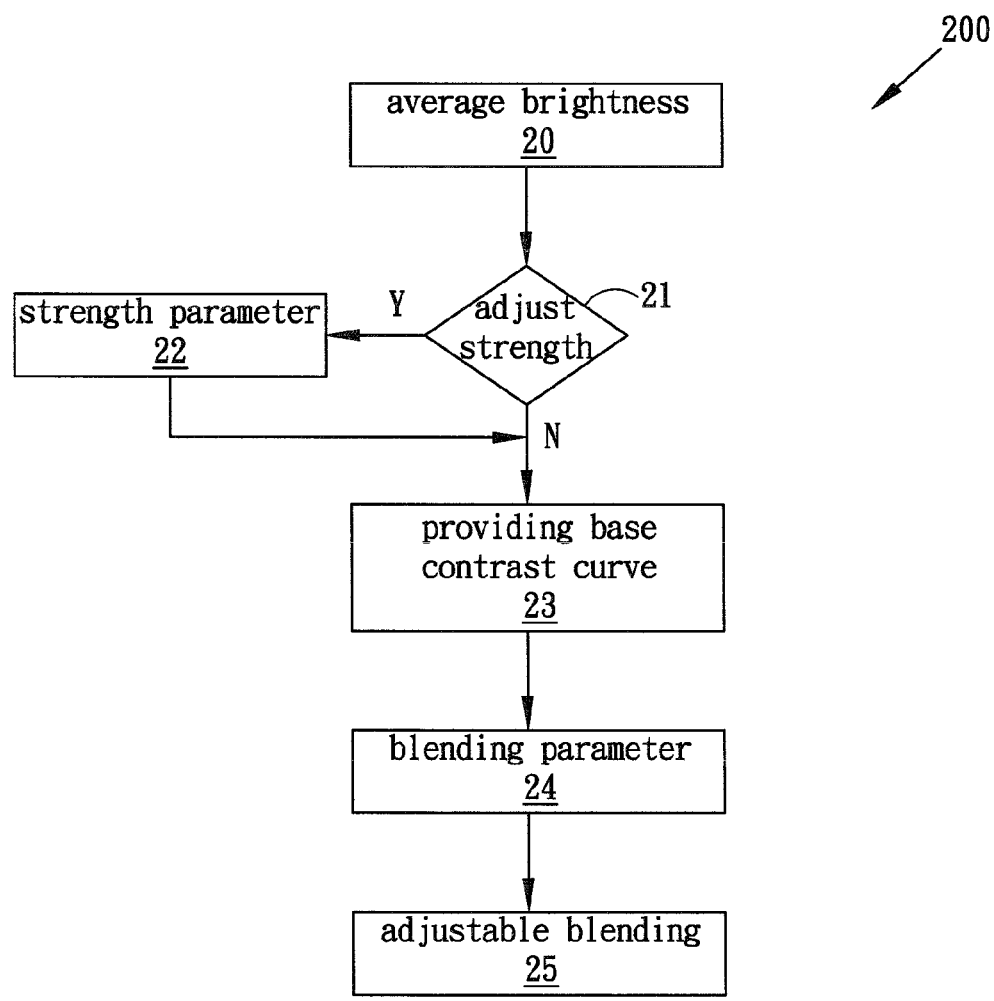
FIG. 2 shows a flow diagram illustrating a method for contrast enhancement according to the embodiment of the present invention.

FIG. 1 shows a block diagram illustrating apparatus 100 for contrast enhancement according to one embodiment of the present invention, and FIG. 2 shows a flow diagram illustrating a method 200 for contrast enhancement according to the embodiment of the present invention. In the embodiment, the apparatus 100 and method 200 are utilized to improve the visual quality of an image with poor intensity distribution. In the embodiment, 8 bits are used for representing the pixel, and thus 256 levels (0-255) are available for the brightness. It is appreciated by those skilled in the art that the number of bits representing the pixel may be other than 8 in accordance with the design need of specific system.

In the embodiment, contrast enhancement transfer functions are defined as follows:

$$Y' = \begin{cases} a - \sqrt{a^2 - Y^2} & \text{if } Y \leq a \\ a + \sqrt{(255-a)^2 - (255-Y)^2} & \text{else} \end{cases} \quad (1)$$

$$Y'' = Y + (Y' - Y) * b \quad (2)$$

$$a = \text{round}(avgBrightness * p) \quad (3)$$

where
Y is the brightness (or luma value) of an input pixel,
Y' is the output of a base contrast curve,
Y" is the brightness of an output pixel,
p is a parameter that defines the strength of the contrast enhancement, and
b is a parameter that defines the closeness of the contrast curve to the linear contrast curve.

The avgBrightness in (3) represents the average brightness of a present image. In the exemplified embodiment, in step 20 (FIG. 2), the pixels of a whole image frame or a portion of the image frame under contrast enhancement (also known as a window) are operated by an adaptable brightness unit 10 (FIG. 1) to obtain their average brightness. In this specification, the term unit is used to denote a circuit, a piece of program, or their combination. The obtained average brightness affects the output Y' in (1) through the brightness value "a", and further affects the output Y" in (2). Accordingly, the apparatus 100 and method 200 are adaptable and are thus able to automatically change their contrast enhancement in order to deal with varied average brightness. This is particularly useful when the apparatus 100 receives various input sources from different imaging devices that have distinct average brightness.

In steps 21-22, the brightness value "a" may be further adjusted. Specifically speaking, in step 21, if the strength of the contrast enhancement needs adjustment, a strength parameter p is retrieved or inputted, for example, by a user (in step 22) to the adaptable brightness unit 10. In the embodiment, this adjustment is done by multiplying the average brightness (avgBrightness) by the parameter p in (3). The operator "round" in (3) represents the mathematical rounding operation. It is appreciated by those skilled in the art that the rounding operation may be omitted if the apparatus 100 is a non-integer system. (The effect of the parameter p on the contrast enhancement will be addressed later.)

Figure 3:
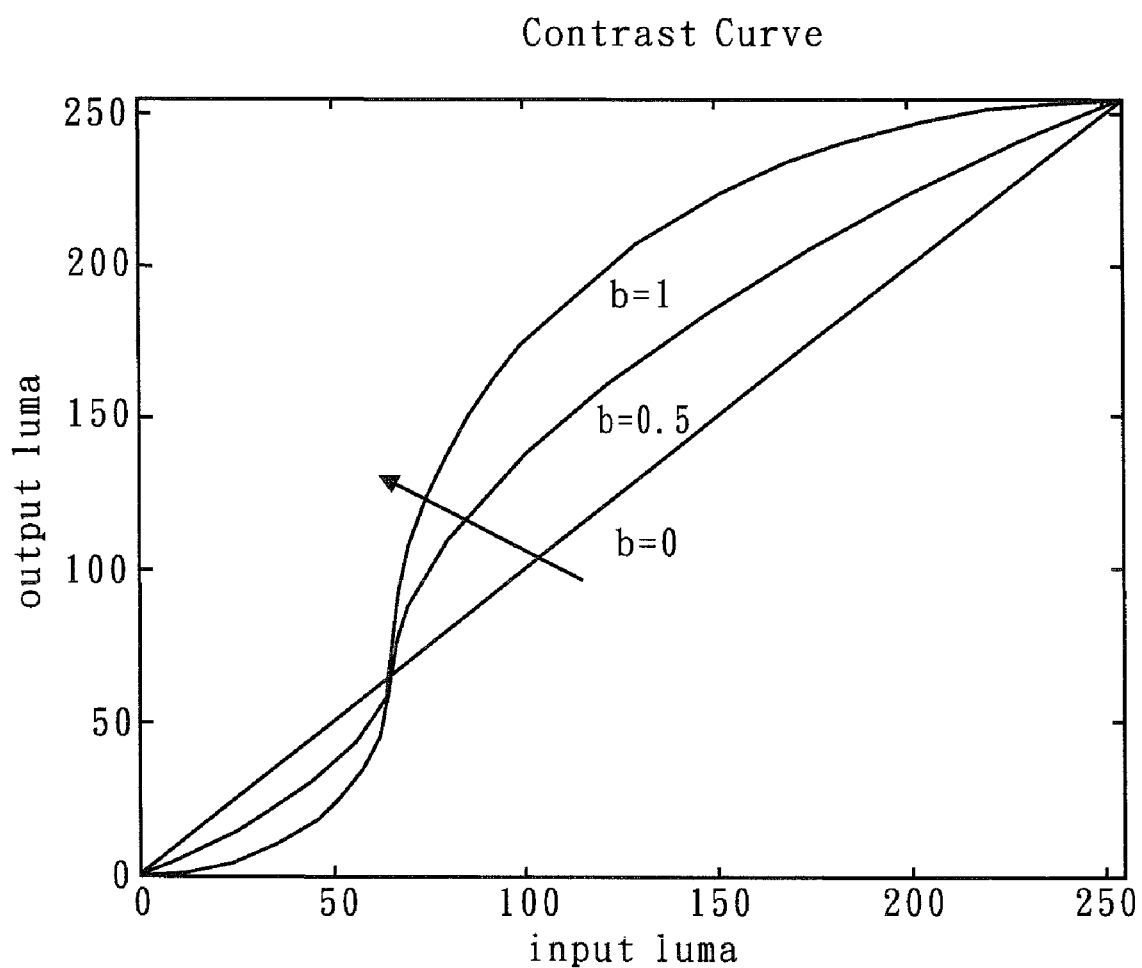
FIG. 3 shows various transfer curves with different blending parameters.

The function Y' expressed in (1) represents a base contrast curve (step 23 and block 12) corresponding to the contrast curve when b=1 as shown in FIG. 3. The function Y" expressed in (2) represents a general contrast curve. The function Y" is made up or blended by at least two portions—a linear portion Y and a nonlinear portion (Y'-Y). The blending (step 25) of the function Y" is done by multiplying the nonlinear portion (Y'-Y) by a blending parameter b, for example, inputted by a user (in step 24) in an adjustable blending unit 14. It is noted that the general contrast curve Y" becomes the base contrast curve Y' when b=1; and the general contrast curve Y" becomes linear contrast curve when b=0. It is observed in FIG. 3 that the distance of the contrast curve Y" (b≠0) to the linear contrast curve (b=0, in which no contrast enhancement is performed) increases as the value of the blending parameter b increases and vice versa. It is also observed in FIG. 3 that the various contrast curves converge on both ends (i.e., 255 and 0 in this example), and all contrast curves have the same transitional point at the value "a". Each contrast curve includes a first curve in a first direction facing the linear contrast curve, and a second curve in a second direction facing the linear contrast curve, wherein the second direction is approximately opposite to the first direction.

Figure 4:
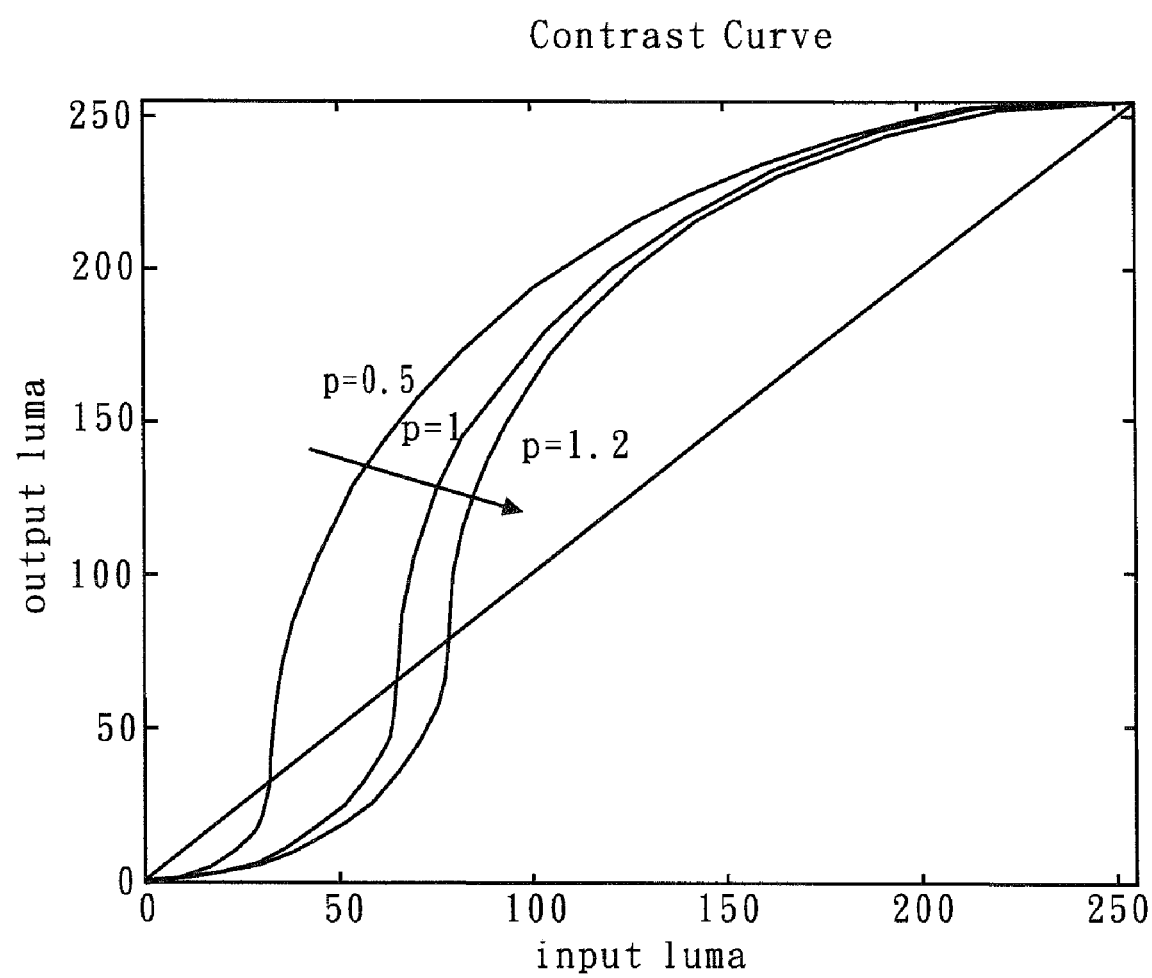
FIG. 4 shows various transfer curves with different strength parameters and transitional points.

As discussed above, the base contrast curve is a function of the brightness value "a", which is further dependent on the strength parameter p, if the strength adjustment is selected. FIG. 4 shows various contrast curves with different parameters p. Specifically speaking, the strength of the contrast curve Y" increases as the value of the strength parameter p increases and vice versa. In the embodiment, a parameter p with value greater than 1 makes the contrast enhancement more aggressive (or larger strength), and alternatively, a parameter p with value less than 1 makes the contrast enhancement less aggressive (or less strength). Furthermore, a smaller parameter p generates a smaller value "a", thereby resulting in smaller transitional point, and vice versa.

Accordingly, the embodiment of the present invention provides apparatus and method in a fast and simple way for contrast enhancement. The disclosed contrast enhancement and its associated contrast curve require substantially less computation compared to the conventional contrast enhancement methods. Moreover, users may conveniently scale the shape and adjust the strength of the contrast curve. Further, a single register with, for example, 6 bits is sufficient for storing both the blending parameter b and the strength parameter p in this embodiment. The apparatus and method of the present embodiment may adaptably and automatically change their contrast enhancement according to varied average brightness.

Although specific embodiments have been illustrated and described, it will be appreciated by those skilled in the art that various modifications may be made without departing from the scope of the present invention, which is intended to be limited solely by the appended claims.

What is claimed is:

1. Apparatus for contrast enhancement, comprising:
    an adjustable blending circuit for adjustably blending a linear contrast function with a nonlinear contrast function, thereby resulting in an adjustable contrast curve;
    wherein the nonlinear contrast function includes difference of a base contrast function that defines a base contrast curve and the linear contrast function; and
    wherein the base contrast function is a function of average brightness of an image.

2. The apparatus of claim 1, wherein the nonlinear contrast function is adjustable.

3. The apparatus of claim 2, wherein the nonlinear contrast function is adjusted by a blending parameter such that distance of the contrast curve to linear contrast curve is changed, wherein the linear contrast curve represents a function in which no contrast enhancement is performed.

4. The apparatus of claim 3, wherein the contrast function defines a first curve in a first direction facing the linear contrast curve, and a second curve in a second direction facing the linear contrast curve, wherein the second direction is approximately opposite to the first direction.

5. The apparatus of claim 1, wherein the average brightness of the image is adjustable.

6. The apparatus of claim 5, wherein the average brightness of the image is adjusted by a strength parameter such that transitional point of the contrast curve is changed.

7. The apparatus of claim 1, wherein the base contrast function is:

$$Y' = \begin{cases} a - \sqrt{a^2 - Y^2} & \text{if } Y \le a \\ a + \sqrt{(255-a)^2 - (255-Y)^2} & \text{else} \end{cases}$$

where Y is an output of the base contrast curve, and Y is luma value of an input pixel,
where a=round(avgBrightness*p), avgBrightness represents average brightness of an image, round represents a mathematical rounding operation, and p is a parameter that defines strength of the contrast enhancement.

8. The apparatus of claim 7, wherein the contrast curve is expressed by:

$$Y''=Y+(Y'-Y)*b$$

where Y" is brightness of an output pixel, and b is a parameter that defines closeness of the contrast curve to a linear contrast curve, wherein the linear contrast curve represents a function in which no contrast enhancement is performed;
    wherein Y represents the linear contrast function, and (Y'-Y) represents the nonlinear contrast function.

9. A method for contrast enhancement embodied in a circuit that performs the step of:
    adjustably blending a linear contrast function with a nonlinear contrast function, thereby resulting in an adjustable contrast curve;
    wherein the nonlinear contrast function includes difference of a base contrast function that defines a base contrast curve and the linear contrast function; and
    wherein the base contrast function is a function of average brightness of an image.

10. The method of claim 9, wherein the nonlinear contrast function is adjustable.

11. The method of claim 10, further comprising a step of adjusting the nonlinear contrast function by a blending parameter such that distance of the contrast curve to linear contrast curve is changed, wherein the linear contrast curve represents a function in which no contrast enhancement is performed.

12. The method of claim 11, wherein the contrast function defines a first curve in a first direction facing the linear contrast curve, and a second curve in a second direction facing the linear contrast curve, wherein the second direction is approximately opposite to the first direction.

13. The method of claim 9, wherein the average brightness of the image is adjustable.

14. The method of claim 13, further comprising a step of adjusting the average brightness of the image by a strength parameter such that transitional point of the contrast curve is changed.

15. The method of claim 9, wherein the base contrast function is:

$$Y' = \begin{cases} a - \sqrt{a^2 - Y^2} & \text{if } Y \le a \\ a + \sqrt{(255-a)^2 - (255-Y)^2} & \text{else} \end{cases}$$

where Y' is an output of the base contrast curve, and Y is luma value of an input pixel, where a=round(avgBrightness*p), avgBrightness represents average brightness of an image, round represents a mathematical rounding operation, and p is a parameter that defines strength of the contrast enhancement.

16. The method of claim 15, wherein the contrast curve is expressed by:

$$Y''=Y+(Y'-Y)*b$$

where Y" is brightness of an output pixel, and b is a parameter that defines closeness of the contrast curve to a linear contrast curve, wherein the linear contrast curve represents a function in which no contrast enhancement is performed;

wherein Y represents the linear contrast function, and (Y'−Y) represents the nonlinear contrast function.

* * * * *